US009752622B2

(12) United States Patent  (10) Patent No.: US 9,752,622 B2
Takanashi  (45) Date of Patent: Sep. 5, 2017

(54) ROLLING BEARING UNIT WITH ROTATING SPEED DETECTOR

(71) Applicant: NSK LTD., Tokyo (JP)

(72) Inventor: Harumi Takanashi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/119,261

(22) PCT Filed: Feb. 17, 2015

(86) PCT No.: PCT/JP2015/054345
§ 371 (c)(1),
(2) Date: Aug. 16, 2016

(87) PCT Pub. No.: WO2015/122540
PCT Pub. Date: Aug. 20, 2015

(65) Prior Publication Data
US 2017/0009813 A1  Jan. 12, 2017

(30) Foreign Application Priority Data

Feb. 17, 2014 (JP) .................... 2014-027588

(51) Int. Cl.
F16C 41/00 (2006.01)
F16C 33/72 (2006.01)
F16C 19/18 (2006.01)

(52) U.S. Cl.
CPC .......... F16C 41/007 (2013.01); F16C 33/723 (2013.01); F16C 19/186 (2013.01); F16C 2233/00 (2013.01); F16C 2326/02 (2013.01)

(58) Field of Classification Search
CPC ..... F16C 19/186; F16C 33/728; F16C 41/007
See application file for complete search history.

(56) References Cited

U.S. PATENT DOCUMENTS

2006/0159377 A1* 7/2006 Shigeoka ............ B60B 27/0005
                                              384/448
2012/0189234 A1   7/2012 Torii
2012/0230621 A1* 9/2012 Inoue ................. B60B 27/0005
                                              384/448

FOREIGN PATENT DOCUMENTS

DE  112010003926 T5  12/2012
JP  H 10-319027 A    12/1998
(Continued)

OTHER PUBLICATIONS

Search Report dated May 26, 2015, issued by the International Searching Authority in counterpart International Application No. PCT/JP2015/054345 (PCT/ISA/210).
(Continued)

Primary Examiner — Phillip A Johnson
(74) Attorney, Agent, or Firm — Sughrue Mion, PLLC

(57) ABSTRACT

The portion axially opposed to an encoder 13a in a bottom part 23a constructing the cap 19a for closing an opening of an axially inboard end of an outer ring 2 is formed with a through hole 25a pierced in an axial direction. And, the bottomed cylindrical sensor insertion case 26a made of a non-magnetic material is axially inserted into an inside of the through hole 25a with a bottom plate part 35a facing to the lead, and is internally fitted to the inside of the through hole 25a. Also, a rubber O ring 56 is pinched in annular space 55 formed between an outer peripheral surface of a cylindrical part 39a constructing the sensor insertion case 26a and an inner peripheral surface of a middle-diameter hole part 53 constructing the through hole 25a in a state having a radial interference.

3 Claims, 7 Drawing Sheets

(56) References Cited

FOREIGN PATENT DOCUMENTS

| JP | H 11-142424 A | 5/1999 | |
|---|---|---|---|
| JP | 2006-162404 A | 6/2006 | |
| JP | WO 2007049602 A1 * | 5/2007 | ............ F16C 19/186 |
| JP | 2011-2029 A | 1/2011 | |
| JP | 2011-80500 A | 4/2011 | |
| JP | 2013-44350 A | 3/2013 | |
| WO | 2004035326 A1 | 4/2004 | |

OTHER PUBLICATIONS

Written Opinion dated May 26, 2015, issued by the International Searching Authority in counterpart International Application No. PCT/JP2015/054345 (PCT/ISA/237).
Supplementary European Search Report dated Feb. 3, 2017, by the European Patent Office in counterpart European Application No. 15749483.2.

* cited by examiner

ROLLING BEARING UNIT WITH ROTATING SPEED DETECTOR

TECHNICAL FIELD

This invention relates to improvements in a rolling bearing unit with a rotating speed detector for supporting a wheel (undriven wheel) of an automobile rotatably with respect to a suspension and also detecting a rotating speed of this wheel.

BACKGROUND ART

A rolling bearing unit is used to support a wheel of an automobile rotatably with respect to a suspension. Also, it is necessary to detect a rotating speed of the wheel in order to control an anti-lock brake system (ABS) or a traction control system (TCS). Because of this, in recent years, a rolling bearing unit with a rotating speed detector installed into the rolling bearing unit commonly supports the wheel rotatably with respect to the suspension and also detects the rotating speed of this wheel.

As one example of a conventional structure of the rolling bearing unit with the rotating speed detector used for such a purpose, a structure as shown in FIGS. 5 and 6 is described in Patent Document 1. A rolling bearing unit 1 with a rotating speed detector of this conventional structure rotatably supports a hub 3 which is a rotating ring in the inner side of an outer ring 2 which is a stationary ring.

The outer ring 2 in this unit 1 has double row outer ring raceways 4a, 4b on an inner peripheral surface, and a stationary side flange 5 on an outer peripheral surface, respectively. Also, in a use state, the outer ring 2 is fixed to a knuckle (not shown) constructing a suspension and is not rotated.

The hub 3 is formed by combining a hub body 6 and an inner ring 7, and has double row inner ring raceways 8a, 8b on an outer peripheral surface, and is supported in the inner side of the outer ring 2 concentrically with this outer ring 2. Concretely, the inner ring raceway 8a of the axially outboard row is directly formed on an axially intermediate portion of the outer peripheral surface of the hub body 6 and also, the inner ring 7 in which the inner ring raceway 8b of the axially inboard row is formed on the outer peripheral surface is externally fitted and fixed to a small-diameter step part 9 formed in the portion near to the axially inboard end (the inboard side in the axial direction refers to the side near to the center of an automobile body in a width direction in a state assembled to the suspension and on the other hand, the outboard side in the axial direction refers to the side near to the outside of the automobile body in the width direction, and this applies to the present description and whole claims) of the same hub body 6. And, a swaged part 10 formed by plastically deforming the axially inboard end of the hub body 6 to the radially outside direction presses an axially inboard end face of the inner ring 7. Also, the portion projected to the axially outboard side beyond an opening of the axially outboard end of the outer ring 2 in the axially outboard end of the hub body 6 is provided with a rotation side flange 11 for supporting a wheel.

Also, plural rolling elements 12, 12 are respectively formed between both of the outer ring raceways 4a, 4b and both of the inner ring raceways 8a, 8b, and the hub 3 is rotatably supported in the inner side of the outer ring 2.

Also, an encoder 13 is externally fitted and fixed to the portion deviating from the inner ring raceway 8b to the axially inboard direction in the axially inboard end of the outer peripheral surface of the inner ring 7. This encoder 13 is formed by combining a metal insert 14 formed on a generally annular shape having substantially an L-shaped cross section by a magnetic metal plate, and an encoder body 16 attached to a side surface of a circular ring part 15 constructing this metal insert 14. This encoder body 16 is formed in a generally circular ring shape by a permanent magnet such as a rubber magnet in which ferrite powder is mixed, and is magnetized in the axial direction and also the direction of magnetization is changed alternately at equal distances with respect to a circumferential direction. Consequently, south poles and north poles are arranged alternately at equal distances in the axially inboard surface which is a detected surface of the encoder body 16.

Also, a seal ring 17 is installed between the opening of the axially outboard end of the outer ring 2 and the outer peripheral surface of the axially intermediate portion of the hub body 6 and also, a cap 19 is attached to an opening of the axially inboard end of the outer ring 2. Accordingly, openings of both of the axial ends of space 18 in which each of the rolling elements 12, 12 and the encoder 13 are installed are closed to prevent grease packed into this space 18 from leaking to external space, or prevent foreign matter present in the external space from entering this space 18.

The cap 19 includes a bottomed cylindrical cap body 20 formed by injection molding of a synthetic resin, and a fitting ring 21 formed in a generally annular shape having an L-shaped cross section by stamping of a non-magnetic metal plate. The cap body 20 in this cap 19 includes a cylindrical part 22, and a bottom part 23 for closing an opening of the axially inboard end of this cylindrical part 22. The fitting ring 21 is fixed (molded) to the inner side portion of the distal end of the cylindrical part 22 in this cap body 20. Also, the portion near to the radially outside of the bottom part 23 is provided with a mounting part 24 (with an increased axial thickness dimension) bulged to the axially inboard as compared with the other portion. The portion axially opposed to the detected surface of the encoder 13 (encoder body 16) in this mounting part 24 is formed with a through hole 25 pierced in the axial direction. And, a bottomed cylindrical sensor insertion case 26 made of a non-magnetic stainless steel plate is internally fitted to this through hole 25. This sensor insertion case 26 is embedded in the mounting part 24 by insert molding at the time of injection molding of the cap body 20. Further, a nut 27 with a female screw formed on an inner peripheral surface is embedded in the portion deviating from the through hole 25 in this mounting part 24 by insert molding too.

A sensor unit 28 for detecting a rotating speed is supported and fixed to the cap 19. This sensor unit 28 includes a sensor 29 and a sensor holder 30. The sensor 29 in this sensor unit 28 is means for providing a detecting part with a magnetic detecting element such as a Hall element or a magnetic resistance element, and changes an output signal according to a change in characteristics of the detected surface of the encoder 13. The sensor holder 30 is formed by injection molding dieing of a synthetic resin, and includes an insertion part 31 for holding the sensor 29, and a mounting flange part 32 for fixing to the cap 19. Such a sensor unit 28 is fixed to the cap 19 (mounting part 24) by screwing a male screw part of a bolt 34 inserted into a through hole formed in the mounting flange part 32 into the female screw part of the nut 27 with the insertion part 31 inserted into the sensor insertion case 26.

According to the rolling bearing unit 1 with the rotating speed detector of the conventional structure having the above configuration, the wheel fixed to the hub 3 can be supported rotatably with respect to the suspension for supporting the outer ring 2. Also, when the encoder 13 is rotated together with the hub 3 with rotation of the wheel, south poles and north poles present in the detected surface of this encoder 13 alternately pass through the vicinity of the detecting part of the sensor 29 opposed to the detected surface of this encoder 13 through a bottom plate part 35 of the sensor insertion case 26. As a result, a direction of magnetic flux flowing in the magnetic detecting element constructing the sensor 29 is alternately changed and characteristics of this magnetic detecting element are alternately changed. Since a frequency at which the characteristics of the magnetic detecting element are changed in this manner is proportional to a rotating speed of the hub 3, the ABS or the TCS can properly be controlled by sending an output signal of the sensor 29 to a controller (not shown). Also, in the case of the conventional structure, the space 18 in which the encoder 13 is installed can be hermetically closed by the cap 19 (and the sensor insertion case 26) even in a state before the sensor unit 28 is assembled on an assembly line of an automobile manufacturer etc., with the result that foreign matter can effectively be prevented from adhering to this encoder 13.

However, in the case of the conventional structure as described above, the following problem may happen.

That is, in the case of the conventional structure, for example, a set of an upper molding die 36 and a lower molding die 37 as shown in FIG. 7 is used to manufacture the cap 19. Concretely, a melted synthetic resin is injected into a cavity 38 having a shape according to an outer surface shape of the cap 19 defined with the upper molding die 36 and the lower molding die 37 abutted in the axial direction. Particularly in the case of the conventional structure, the synthetic resin is injected into this cavity 38 with the sensor insertion case 26 set (insert molding is performed). Also, in order to set an installation position of the sensor insertion case 26 in the case of performing such insert molding, the bottom plate part 35 constructing this sensor insertion case 26 is abutted on a part of the lower molding die 37 and also, a part of the upper molding die 36 is abutted (bitten) on an axially inside surface (a convex curved surface) of a bent part 41 which is the part of continuity between a cylindrical part 39 and a rib part 40 constructing the sensor insertion case 26 similarly. Consequently, position accuracy of the bottom plate part 35 of the sensor insertion case 26 with respect to all abutting surface 42 (see FIG. 6) abutted on an axially inboard end face of the outer ring 2 in an assembly state in the cap 19 is controlled by dimension accuracy of the lower molding die 37, and position accuracy of the bent part 41 (abutting part) with respect to an axially inboard surface of the bottom part 23 constructing the cap 19 is controlled by dimension accuracy of the upper molding die 36.

Here, the sensor insertion case 26 is formed by stamping (deep-drawing) a non-magnetic stainless steel plate, and this non-magnetic stainless steel plate has high work-hardening properties, with the result that it is difficult to obtain high dimension accuracy (shape accuracy) stably by the deep drawing. Further, it is difficult to accurately regulate a shape (convex curved surface shape) of the folded part 41 in the sensor insertion case 26. As a result, an individual difference may be caused in a distance X from an axially outboard surface of the bottom plate part 35 of the sensor insertion case 26 to the portion, on which a part of the upper molding die 36 is abutted, in the bent part 41, and the following problem may be caused.

First, when the distance X is shorter than a distance Y defined by the upper molding die 36 and the lower molding die 37 (X<Y), a stamping force (bite amount) of the upper molding die 36 on the bent part 41 becomes inadequate, and a melted resin may leak out of this abutting portion to the inside of the sensor insertion case 26 and it may be solidified. In such a case, work of removing the solidified synthetic resin (burr) becomes complicated due to the fact that a bore diameter dimension of the through hole 25 is small.

On the other hand, when the distance X is longer than the distance Y (X>Y), wear (including scratch etc.) may occur in the portion abutted on the bent part 41 in the upper molding die 36, and the wear becomes a cause of a decrease in a life of the upper molding die 36. Also, deformation including buckling may be caused in the cylindrical part 39 constructing the sensor insertion case 26, and it may become resistant to inserting the insertion part 31 constructing the sensor holder 30 into the inside of this cylindrical part 39. Further, when injection molding is performed with the cylindrical part 39 elastically deformed (expanded) to the radial outside based on the pressing force of the upper molding die 36 and then the cap 19 is taken out of the cavity 38 (the pressing force by the upper molding die 36 is eliminated), the cylindrical part 39 is elastically restored (becomes small in diameter), with the result that a gap may be formed between an outer peripheral surface of the cylindrical part 39 and the portion present in the periphery of this cylindrical part 39 in the synthetic resin. Such a gap is not desirable since a decrease in sealing properties by the cap 19 is caused.

In addition, it is generally known that the synthetic resin is contracted by a decrease in volume in the case of being cooled and solidified. As a result, the gap formed by the cause as described above may be cleared or decreased by contracting the portion present in the periphery of the cylindrical part 39 in the synthetic resin constructing the cap body 20. However, it is difficult to completely clear the gap since a bore diameter dimension of the through hole 25 is normally about 10 mm and is small in diameter and the amount of contraction associated with solidification is small.

In the case of the conventional structure as described above, a problem of the need for work of removing the solidified synthetic resin from the inside of the sensor insertion case 26 or a decrease in sealing properties by the cap 19 or deformation of the sensor insertion case 26 may arise due to variations in dimension accuracy of the sensor insertion case 26.

RELATED ART REFERENCE

Patent Document

Patent Document 1: JP-A-2011-80500

SUMMARY OF THE INVENTION

Problems to be Solved by the Invention

In view of the circumstances as described above, an object of the invention is to implement a rolling bearing unit with a rotating speed detector capable of fully ensuring sealing properties by a cap while preventing damage to a sensor insertion case regardless of dimension accuracy of the sensor insertion case without requiring complicated work.

Means for Solving the Problems

A rolling bearing unit with a rotating speed detector of the invention is a unit used for supporting a wheel for an undriven wheel rotatably with respect to a suspension such as a knuckle, and includes an outer ring, a hub, plural rolling elements, an encoder, a cap, a sensor insertion case, and a sensor unit.

The outer ring in the unit has double row outer ring raceways on an inner peripheral surface and is not rotated in use.

The hub has double row inner ring raceways on an outer peripheral surface and is supported in a bore diameter side of the outer ring concentrically with the outer ring and has a rotation side flange for supporting a wheel in a portion projected to an axially outboard side beyond an axially outboard end of the outer ring in the outer peripheral surface.

Each of the plural rolling elements is rollably formed between both of the outer ring raceways and both of the inner ring raceways every both rows, respectively.

The encoder is formed by changing magnetic characteristics of an axially inside surface alternately with respect to a circumferential direction, and is supported in an axially inboard end of the hub concentrically with the hub.

The cap is made of a synthetic resin, and is attached to an axially inboard end of the outer ring and closes an opening of the axially inboard end of the outer ring.

The sensor insertion case is made of a non-magnetic material and is formed in a bottomed cylindrical shape, and is internally fitted to an inside of a through hole formed in a portion axially opposed to the encoder in the cap.

The sensor unit includes a sensor and a sensor holder.

The sensor in the sensor unit is opposed to a detected surface of the encoder through a bottom plate part of the sensor insertion case and changes an output signal according to a change in characteristics of the detected surface of the encoder.

The sensor holder has an insertion part which holds the sensor and also is inserted into an inside of the sensor insertion case, and a mounting flange part which is formed on a proximal end of the insertion part and is coupled and fixed to an axially inboard surface of the cap.

Particularly, in the case of the rolling bearing unit with the rotating speed detector of the invention, the sensor insertion case is internally fitted to the inside of the through hole by being axially inserted into the inside of the through hole previously formed in the cap.

Also, an annular elastic member (for example, an O ring with a circular or rectangular cross section) is pinched between an outer peripheral surface of the sensor insertion case and an axially inboard end side portion in an inner peripheral surface of the through hole in a state having a radial interference.

In the case of implementing the invention, preferably, like the invention described in, for example, claim 2, the sensor insertion case has a cylindrical part, the bottom plate part for closing an opening of an axially outboard end of the cylindrical part, and a rib part bent from an axially inboard end of the cylindrical part to a radial outside.

Also, an opening edge part of the through hole in an axial inside surface of the cap is provided with a step surface recessed to an axially outboard side.

And, the rib part is axially pinched between the step surface and the mounting flange part constructing the sensor holder.

Also, like the invention described in, for example, claim 3, an engaging unit configured to prevent the sensor insertion case from being axially displaced with respect to the cap is formed between the cap and the sensor insertion case.

Advantage of the Invention

According to the invention constructed as described above, the rolling bearing unit with the rotating speed detector capable of fully ensuring sealing properties by the cap while preventing damage to the sensor insertion case regardless of dimension accuracy of the sensor insertion case can be obtained without requiring complicated work.

That is, in the case of the invention, a structure in which the sensor insertion case is axially inserted and internally fitted to the inside of the through hole previously formed in the cap rather than a molding structure (integral structure) by insert molding like the case of the conventional structure shown in FIGS. 5 and 6 is adopted as a structure of attachment of the sensor insertion case to the cap. As a result, it becomes unnecessary to do complicated work of removing a solidified synthetic resin from the inside of the sensor insertion case. Also, since the sensor insertion case is not pressed by a pair of metal molding die used at the time of injection molding of the cap, damage (deformation) to the sensor insertion case can be prevented and also, a gap is not formed in the periphery of the sensor insertion case due to the fact that the sensor insertion case is elastically deformed to the radially outside.

Moreover, in the case of the invention, the annular elastic member is pinched between the outer peripheral surface of the sensor insertion case and the axially inboard end side portion in the inner peripheral surface of the through hole in the state having the radial interference. As a result, foreign matter such as water can effectively be prevented from intruding the space provided with the rolling elements or the encoder through the portion between the outer peripheral surface of the sensor insertion case and the inner peripheral surface of the through hole. Consequently, the invention can fully ensure the sealing properties by the cap.

MODES FOR CARRYING OUT THE INVENTION

First Embodiment

Figure 1:
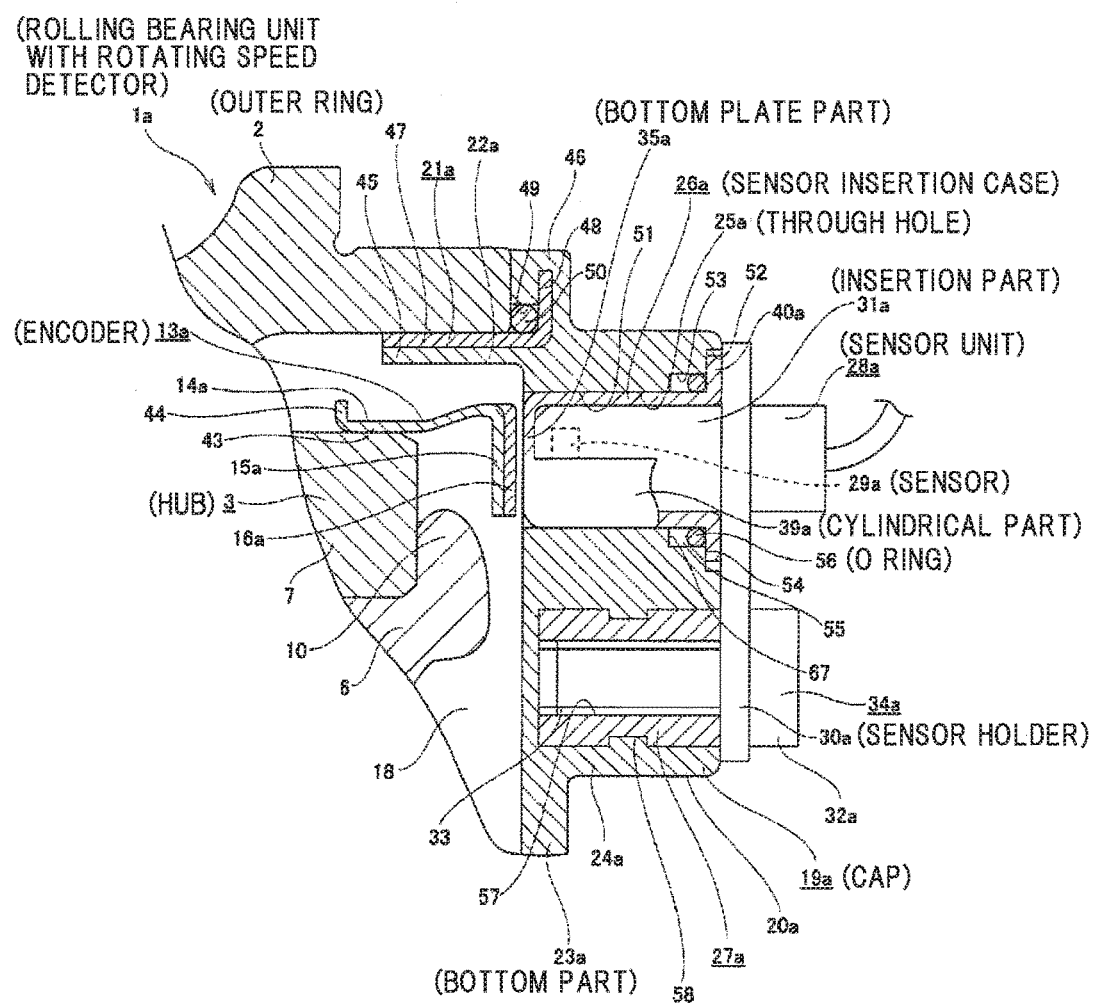
FIG. 1 is a partially sectional view of a rolling bearing unit with a rotating speed detector of a first embodiment of the invention.

FIG. 1 shows a rolling bearing unit 1*a* with a rotating speed detector of a first embodiment of the invention. The present embodiment is characterized by devising a structure in which a sensor insertion case 26*a* is mounted on a cap 19*a* (cap body 20*a*) for closing an opening of the axially inboard end of an outer ring 2.

Since action and effect and a configuration of the other portion basically have the same as those of the case of the conventional structure described above, overlap illustration and explanation are omitted or simplified and hereinafter, the characterizing portion of the present embodiment and the portion which is not described previously will be described mainly.

Figure 5:
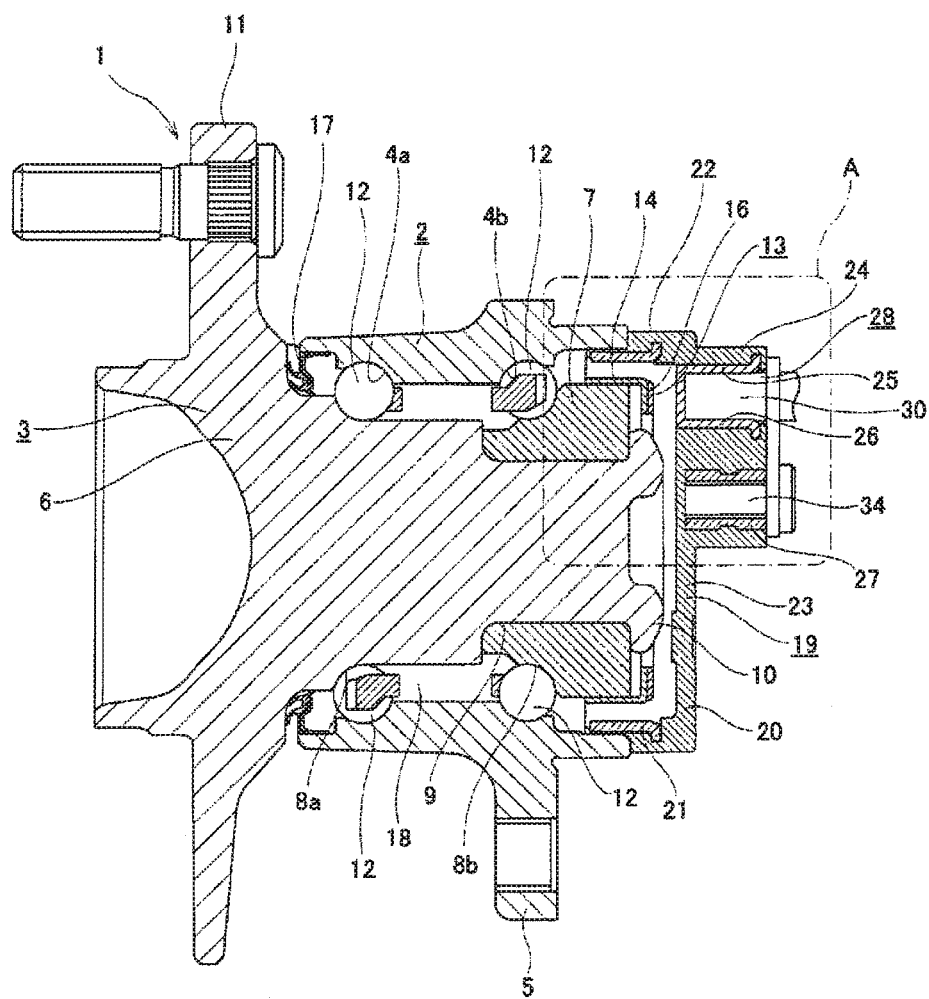
FIG. 5 is a sectional part showing a rolling bearing unit with a rotating speed detector of a conventional structure.

The rolling bearing unit 1a with the rotating speed detector of the present embodiment is a unit for supporting a wheel which is an undriven wheel rotatably with respect to a suspension such as a knuckle and also detecting a rotating speed of this wheel, and a hub 3 which is a rotating ring is rotatably supported in the inner side of the outer ring 2 which is a stationary ring through plural rolling elements 12, 12 (see FIG. 5).

The outer ring 2 and a hub body 6 constructing the hub 3 are made of medium-carbon steel such as S53C, and a surface of each of at least the raceways 4a, 4b, 8a (see FIG. 5) is subjected to hardening treatment such as induction hardening. On the other hand, the rolling elements 12, 12 and an inner ring 7 constructing the hub 3 are made of high-carbon chromium bearing steel such as SUJ2, and are subjected to hardening treatment by, for example, through hardening. In addition, the rolling element 12 used is not limited to a ball as shown in FIG. 5. When the rolling bearing unit 1a with the rotating speed detector of the present embodiment is used for an automobile with heavy weight, a tapered roller can also be used as the rolling element 12.

Also, an encoder 13a is externally fitted and fixed (press fitted) to the axially inboard end (right end of FIG. 1) of an outer peripheral surface of the inner ring 7. This encoder 13a includes a support ring 14a and an encoder body 16a. The support ring 14a in this encoder 13a is formed in a generally annular shape having substantially an L-shaped cross section by stamping a cold-rolled steel plate such as SPCC subjected to rust preventing treatment or a ferritic stainless steel plate such as SUS430. Also, the support ring 14a includes a tubular fitting tubular part 43, an outboard rib part 44 formed in a state folded from the axially outboard end (left end of FIG. 1) of the fitting tubular part 43 to the radial outside, and a circular ring part 15a formed in a state folded from the axially inboard end of the fitting tubular part 43 to the radial inside. Also, the fitting tubular part 43 includes a small-diameter part which is formed in an axially outboard half part and is directly externally fitted to the axially inboard end of the inner ring 7, and a tapered part which is formed in an axially inboard half part and is inclined in a direction of increasing an outside diameter dimension toward the axially inboard. In the case of the present embodiment, an axial position of the support cap 14a is set so that an axially inboard surface of the circular ring part 15a and an axially inboard end face of the outer ring 2 are positioned in the same virtual plane with such a support ring 14a pressed in the axially inboard end of the inner ring 7. Also, the encoder body 16 is formed in a generally circular ring shape by a permanent magnet such as a plastic magnet or a rubber magnet in which a magnetic substance such as ferrite powder is mixed, and is magnetized in the axial direction and also the direction of magnetization is changed alternately at equal distances with respect to a circumferential direction. And, with such an encoder body 16a attached to the axially inboard surface of the circular ring part 15a, an axially inboard surface (a detected surface) of this encoder body 16a is positioned in the axially inboard side beyond an axially inboard end face of a swaged part 10 formed in the axially inboard end of the hub body 6.

The cap 19a attached to the axially inboard end of the outer ring 2 includes the cap body 20a and a fitting ring 21a. The cap body 20a in this cap 19a is formed by injection-molding, for example, a polyamide resin mixed material in which glass fiber is properly added to a polyamide 66 resin. Water resistance can be improved more by properly adding an amorphous aromatic polyamide resin (modified polyamide 6T/6I) or a low water-absorption aliphatic polyamide resin (polyamide 11 resin, polyamide 12 resin, polyamide 610 resin, polyamide 612 resin) to a polyamide resin. The cap body 20a formed in this manner has a bottomed cylindrical shape, and includes a cylindrical part 22a internally fitted and fixed to the axially inboard end of the outer ring 2, and a bottom part 23a for closing an opening of the axially inboard end of this cylindrical part 22a. The distal end (axially outboard end) in this cylindrical part 22a is provided with a small-diameter support tubular part 45 inserted into the inner side of the outer ring 2, and an axially intermediate portion in this cylindrical part 22a is provided with an abutting rib part 46 whose axially outboard surface is abutted on the axially inboard end face of the outer ring 2.

The fitting ring 21a is fixed to a distal half part of the cylindrical part 22a having such a configuration by molding at the time of injection molding of the cap body 20a. The fitting ring 21a is formed in a generally annular shape having substantially an L-shaped cross section by stamping a cold-rolled steel plate such as SPCC. In addition, for example, an austenitic stainless steel plate such as SUS304 can be used as a material of the fitting ring 21a so as not to adversely affect detection performance of a sensor 29a described below. Such a fitting ring 21a includes a cylindrical press-in tubular part 47, and an outboard flange part 48 with a circular ring shape perpendicularly folded from the axially inboard end of the press-in tubular part 47 toward the radial outside. The press-in tubular part 47 in the fitting ring 21a is fixed to the outside diameter side of the support tubular part 45, and the outboard flange part 48 is arranged (molded) inside the abutting rib part 46. Also, a radially inner half part of an axially outboard surface of this abutting rib part 46 is formed with a recessed groove 49 over the whole periphery, and a bottom part of this recessed groove 49 is constructed of an axially outboard surface of the outboard flange part 48. Also, a rubber O ring 50 with a circular cross section is attached to the inside of this recessed groove 49. And, with the cap 19a attached to the outer ring 2, the press-in tubular part 47 is internally fitted (metal-fitted) to the axially inboard end of this outer ring 2 by press-fit, and a radially outer half part of the axially outboard surface of the abutting rib part 46 is abutted on the axially inboard end face of the outer ring 2. Also, in this state, the O ring 50 is pinched between the axially outboard surface of the outboard flange part 48 and the axially inboard end face of the outer ring 2 in an axially compressed state. As a result, even when foreign matter such as water enters from an abutting part between the axially outboard surface of the abutting rib part 46 and the axially inboard end face of the outer ring 2, the O ring 50 effectively prevents such foreign matter from reaching a metal contact part between an outer peripheral surface of the press-in tubular part 47 and an inner peripheral surface of the axially inboard end of the outer ring 2.

In the case of the present embodiment, an axially inboard surface of the abutting rib part 46 is used as a pushing surface for press-fitting the cap 19a to the axially outboard in the case of attaching the cap 19a to the outer ring 2. As a result, a fitting force applied from this pushing surface (axially inboard surface of the abutting rib part 46) can be transmitted to the press-in tubular part 47 through the outboard flange part 48 of the fitting ring 21a. Consequently, work of press-fitting this press-in tubular part 47 in the axially inboard end of the outer ring 2 can be done efficiently. In addition, depending on a position relation between a pushing surface by a tool and the portion press-fitted in the axially inboard end of the outer ring, means including a press-in tubular part and an inward flange part perpendicularly folded from the axially inboard end of this press-in tubular part toward the radially inside can also be used as the fitting ring. In the case of adopting such a configuration, the flow of a melted resin (flow of the melted resin of the periphery of the fitting ring) at the time of injection molding of the cap body can be improved.

Figure 7:
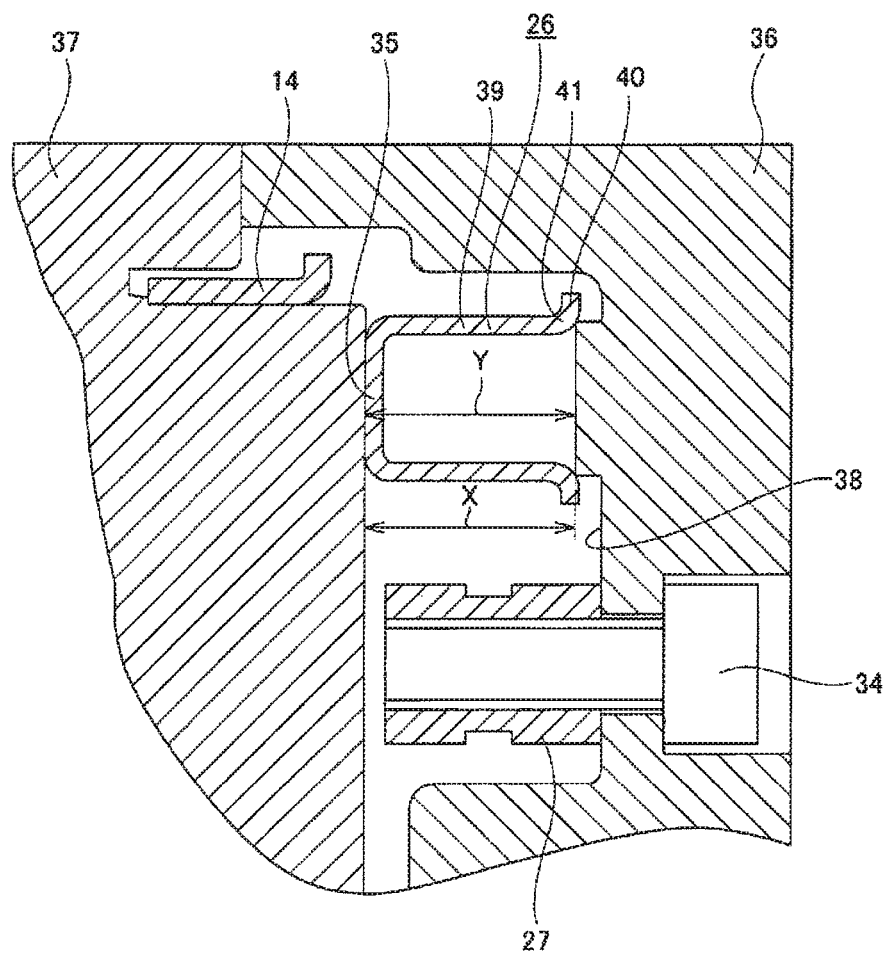
FIG. 7 is a partially sectional view of a metal mold describing a manufacturing step of a conventional cap.

Also, the portion near to the radially outside of the bottom part 23a constructing the cap body 20a is provided with a mounting part 24a (with an axial thickness dimension increased about two to four times) bulged to the axially inboard side as compared with the other portion. Also, the portion axially opposed to the detected surface of the encoder 13a (encoder body 16a) in this mounting part 24a is formed with a through hole 25a pierced in the axial direction. This through hole 25a is a stepped hole, and has a small-diameter hole part 51 formed between the axially outboard end and the intermediate part, a large-diameter hole part 52 formed in an opening edge part of the axially inboard end, and a middle-diameter hole part 53 formed in the portion (portion near to the axially inboard end) between the small-diameter hole part 51 and the large-diameter hole part 52. Also, in the case of the present embodiment, bore diameters of these hole parts 51, 52, 53 are respectively maintained constant over the axial direction. The cap 19a of the present embodiment including the through hole 25a having such a shape can be formed by injection molding (axial draw molding) using an apparatus including a metal mold insertion part having an outer peripheral surface shape according to an inner peripheral surface shape of this through hole 25a in a part of one metal mold of a pair of metal molds as shown in FIG. 7.

In the case of the present embodiment, the sensor insertion case 26a is inserted from the axially inboard side into the inside of the through hole 25a formed at the time of injection molding of the cap body 20a to thereby internally fit this sensor insertion case 26a to the inside of this through hole 25a. This sensor insertion case 26a is about 0.1 to 1.5 mm (preferably 0.2 to 1.0 mm, more preferably 0.4 to 0.8 mm) in plate thickness, and is formed by stamping (for example, deep-drawing) a non-magnetic metal plate (for example, an austenitic stainless steel plate such as SUS304) and further performing annealing treatment in the case of becoming magnetized after the stamping, or by injection-molding a synthetic resin. Also, the sensor insertion case 26a has a bottomed cylindrical shape, and has a cylindrical part 39a, a bottom plate part 35a for closing an opening of the axially outboard end of this cylindrical part 39a, and a rib part 40a bent from the axially inboard end of this cylindrical part 39a to the radially outside.

An outside diameter dimension of the cylindrical part 39a in the sensor insertion case 26a is slightly smaller or slightly larger than a bore diameter dimension of the small-diameter hole part 51 constructing the through hole 25a. As a result, the cylindrical part 39a is inserted into the inside of this small-diameter hole part 51 in a state having a slight radial gap, or is pressed in the inside of this small-diameter hole part 51 in a state having an interference slightly. In the case of being pressed in thus, the press-in portion performs axial positioning of the sensor insertion case 26a with respect to the cap 19a (unintended displacement is prevented).

In addition, in the illustrated structure, an outer peripheral surface of the cylindrical part 39a is formed in a simple cylindrical surface shape, but when the hardness of a material constructing the sensor insertion case 26a is higher than that of a material constructing the cap body 20a, a holding force of the sensor insertion case 26a can also be improved by forming serrations (or knurls) on the outer peripheral surface of the cylindrical part 39a and biting the serration portion into an inner peripheral surface of the small-diameter hole part 51.

An outside diameter dimension of the rib part 40a is smaller than a bore diameter dimension of the large-diameter hole part 52 and is larger than a bore diameter dimension of the middle-diameter hole part 53 constructing the through hole 25a. Also, a plate thickness of the rib part 40a is slightly thicker than or equal to an axial depth dimension of the large-diameter hole part 52. Consequently, the rib part 40a is arranged inside the large-diameter hole part 52 by inserting the sensor insertion case 26a into the inside of the through hole 25a from the axially inboard side with the bottom plate part 35a facing to the lead. Also, an axially outboard surface of the rib part 40a is abutted on a step surface 54 present between this large-diameter hole part 52 and the middle-diameter hole part 53. This step surface 54 has a circular ring shape, and is formed on an opening edge part of the through hole 25a in an axially inboard surface of the bottom part 23a constructing the cap body 20a in a state recessed to the axially outside.

Also, in a state in which the axially outboard surface of the rib part 40a is abutted on the step surface 54, an axially outboard surface of the bottom plate part 35a is positioned in the same virtual plane as an axially outboard surface of the bottom part 23a constructing the cap body 20a or is positioned to the axially outboard side beyond this axially outboard surface of the bottom part 23a. And, in this state, the axially outboard surface of the bottom plate part 35a is opposed in proximity to the detected surface of the encoder 13a through a predetermined axial gap (air gap).

In the case of the present embodiment, an O ring 56 which has a circular cross section and is made of an elastic material such as rubber or elastomer is installed in annular space 55 with a rectangular cross section formed between the outer peripheral surface of the cylindrical part 39a and an inner peripheral surface of the middle-diameter hole part 53 constructing the through hole 25a. This O ring 56 is pinched between the outer peripheral surface of the cylindrical part 39a and the inner peripheral surface of the middle-diameter hole part 53 in a state having a radial interference. Also, the axially inboard end of the O ring 56 elastically abuts on the axially outboard surface of the rib part 40a, but the axially outboard end of this O ring 56 has a gap with a step surface 67 present between the middle-diameter hole part 53 and the small-diameter hole part 51. A bore diameter dimension of such an O ring 56 in a free state is smaller than an outside diameter dimension of the cylindrical part 39a constructing the sensor insertion case 26a, and an outside diameter dimension of the O ring 56 in a state externally fitted to the periphery of this cylindrical part 39a is larger than a bore diameter dimension of the middle-diameter hole part 53.

Figure 4:
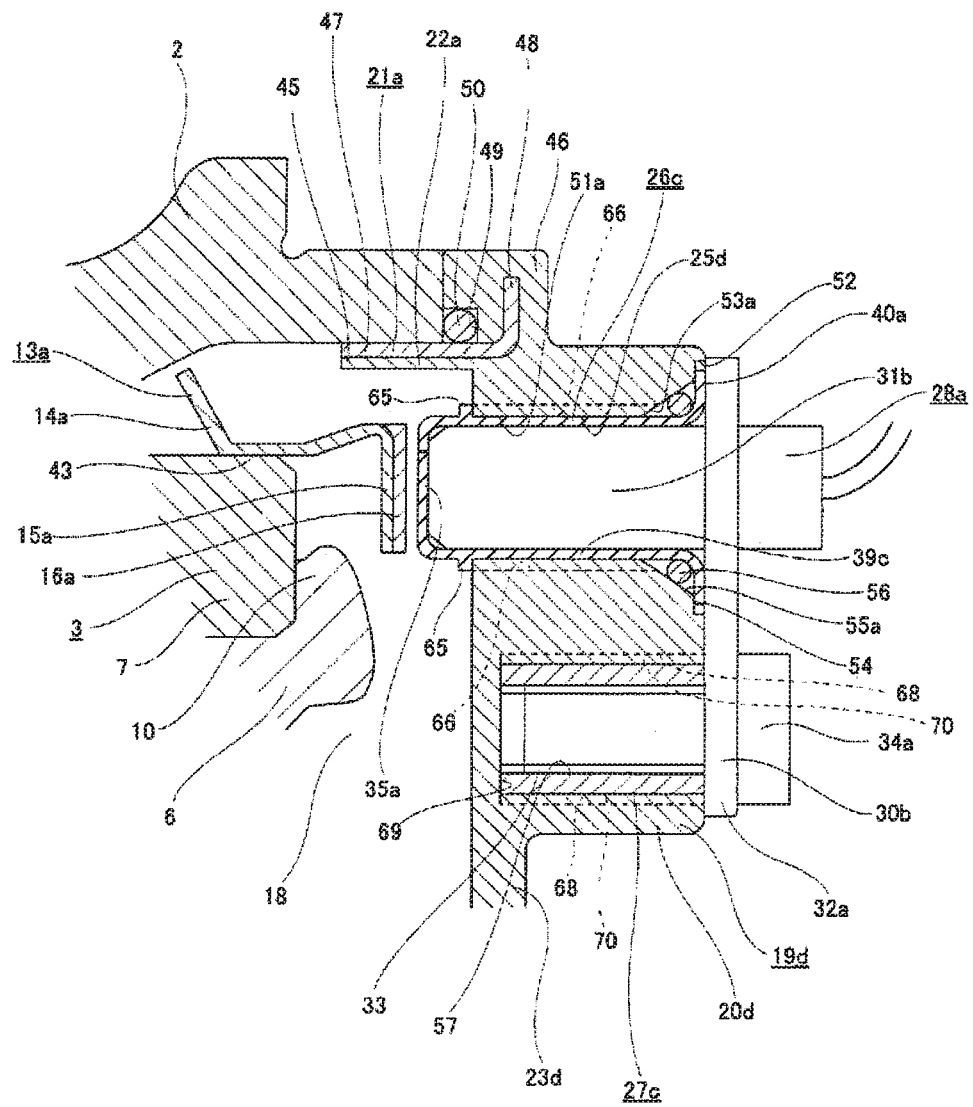
FIG. 4 is a partially sectional view of a rolling bearing unit with a rotating speed detector of a fourth embodiment of the invention.

A nut 27a is embedded in the portion deviating from the through hole 25a (and the sensor insertion case 26a) in the mounting part 24a of the bottom part 23a constructing the cap body 20a by insert molding performed in a state (see FIG. 7) screwed into a male screw. In addition, when the nut 27a has a structure (a cap nut) which is not pierced in the axial direction like a nut 27b shown in FIG. 2, it is unnecessary to be screwed into a male screw at the time of insert molding, with the result that workability of the insert molding can be improved. Also, as shown in FIG. 4 (a fourth embodiment), a nut 27c whose outer peripheral surface is provided with a locking protrusion bar 70 can be pressed in a bottomed nut insertion hole 69 whose inner peripheral surface is formed with a locking recessed groove 68 formed in a cap body 20*d* in a state adjusting a phase between the locking protrusion bar 70 and the locking recessed groove 68, or a nut whose outer peripheral surface is formed with an axially long protrusion bar such as a serration can be pressed in a nut insertion hole formed in a bottomed cylindrical shape and this protrusion bar can form an inner peripheral surface of the nut insertion hole with a recessed groove to lock the nut. Anyway, an inner peripheral surface of the nut 27*a* is formed with a female screw part 57, and an axially intermediate portion of an outer peripheral surface of the nut 27*a* is formed with a recessed groove 58 over the whole periphery. Also, an axially inboard end face of the nut 27*a* is positioned in the same virtual plane as an axially inboard surface of the mounting part 24*a*, and the female screw part 57 is opened to the axially inboard surface of this mounting part 24*a*. However, since an axial dimension of the nut 27*a* is shorter than an axial dimension of this mounting part 24*a*, the female screw part 57 is not opened (is closed by a resin) to an axially outboard surface of the bottom part 23*a* (mounting part 24*a*). In the nut 27*a*, axial displacement of this nut 27*a* is prevented by engagement between the recessed groove 58 formed in the outer peripheral surface and a resin with which the inside of this recessed groove 58 is filled.

In the case of the present embodiment, a sensor unit 28*a* for detecting a rotating speed is supported and fixed to the cap 19*a* having the configuration as described above. This sensor unit 28*a* includes a sensor 29*a* and a sensor holder 30*a*. The sensor 29*a* in this sensor unit 28*a* is means for providing a detecting part with a magnetic detecting element such as a Hall element or a magnetic resistance element, and changes an output signal according to a change in characteristics of the detected surface of the encoder 13*a*. The sensor holder 30*a* is formed by injection molding of a synthetic resin such as a polyamide resin, and includes an insertion part 31*a*, with substantially a columnar shape (bar shape), which holds the sensor 29*a* in the distal end (axially outboard end) and has an outside diameter dimension slightly smaller than a bore diameter dimension of the cylindrical part 39*a* constructing the sensor insertion case 26*a*, and a mounting flange part 32*a* for fixing to the cap 19*a*. Such a sensor unit 28*a* is fixed to the cap 19*a* (mounting part 24*a*) by screwing a male screw part 33 of a bolt 34*a* inserted into a through hole formed in the mounting flange part 32*a* into the female screw part 57 of the nut 27*a* with the insertion part 31*a* inserted into the sensor insertion case 26*a*.

Also, in a state in which the sensor unit 28*a* is supported and fixed to the cap 19*a*, a distal end face (axially outboard end face) of the insertion part 31*a* is opposed in proximity to an axially inboard surface of the bottom plate part 35*a* constructing the sensor insertion case 26*a* through a small gap in the axial direction, or the distal end face of the insertion part 31*a* becomes abutting on the axially inboard surface of the bottom plate part 35*a*. And, (the detecting part of) the sensor 29*a* held in the distal end of the insertion part 31*a* is opposed to the detected surface of the encoder 13*a* through the bottom plate part 35*a*. Also, the rib part 40*a* constructing the sensor insertion case 26*a* is axially pinched between an axially outboard surface of the mounting flange part 32*a* and the step surface 54 formed on the cap body 20*a*.

Also, in the case of the present embodiment having the configuration as described above, the wheel fixed to the hub 3 can be supported rotatably with respect to the suspension for supporting the outer ring 2. Also, when the encoder 13*a* is rotated together with the hub 3 with rotation of the wheel, south poles and north poles present in the detected surface of this encoder 13*a* alternately pass through the vicinity of the detecting part of the sensor 29*a* opposed to the detected surface of this encoder 13*a* through the bottom plate part 35*a* of the sensor insertion case 26*a*. As a result, a direction of magnetic flux flowing in the magnetic detecting element constructing the sensor 29*a* is alternately changed and characteristics of this magnetic detecting element are alternately changed. Since a frequency at which the characteristics of the magnetic detecting element are changed in this manner is proportional to a rotating speed of the hub 3, an ABS or a TCS can properly be controlled by sending an output signal of the sensor 29*a* to a controller (not shown).

Particularly in the case of the present embodiment, the rolling bearing unit 1*a* with the rotating speed detector capable of fully ensuring sealing properties by the cap 19*a* while preventing damage to the sensor insertion case 26*a* regardless of dimension accuracy of the sensor insertion case 26*a* can be obtained without requiring complicated work.

Figure 6:
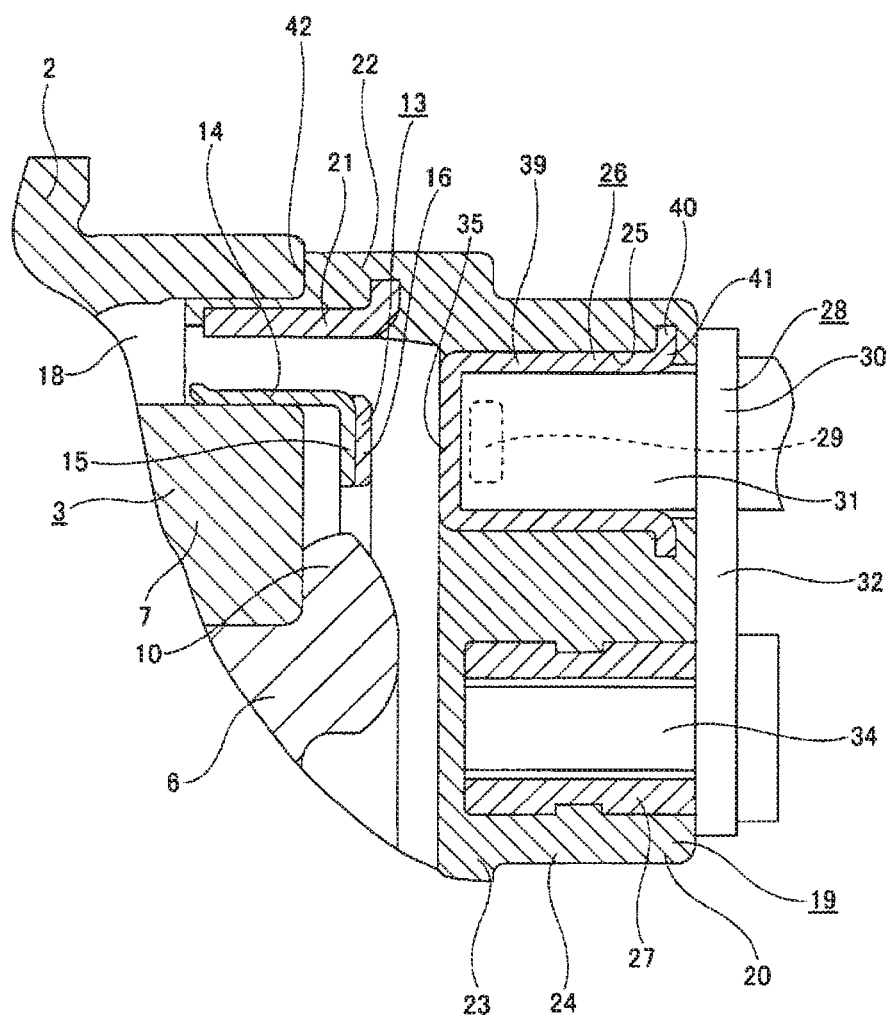
FIG. 6 is an enlarged view of Part A of FIG. 5.

That is, in the case of the present embodiment, the sensor insertion case 26*a* is manufactured by stamping a non-magnetic metal plate like the case of the conventional structure, with the result that it is difficult to ensure fully high dimension accuracy of the sensor insertion case 26*a* after the completion. However, in the case of the present embodiment, a structure in which the sensor insertion case 26*a* is axially inserted and internally fitted to the inside of the through hole 25*a* previously formed in the cap body 20*a* rather than a molding structure (integral structure) by insert molding like the case of the conventional structure shown in FIGS. 5 and 6 is adopted as a structure of attachment of the sensor insertion case 26*a* to the cap 19*a*. As a result, it becomes unnecessary to do complicated work of removing a solidified synthetic resin from the inside of the sensor insertion case 26*a* like the case of the conventional structure. Also, since the sensor insertion case 26*a* is not pressed (pinched) by a pair of molding dies used at the time of injection molding of the cap body 20*a*, damage (deformation) to this sensor insertion case 26*a* can be prevented and also, a gap is not formed in the periphery of this cylindrical part 39*a* due to the fact that the cylindrical part 39 of this sensor insertion case 26*a* is elastically deformed (expanded) to the radially outside. Moreover, in the case of the present embodiment, the O ring 56 is pinched between the outer peripheral surface of this cylindrical part 39*a* and the inner peripheral surface of the middle-diameter hole part 53 constructing the through hole 25*a* in the state having the radial interference. Consequently, foreign matter such as water can effectively be prevented from entering the space 18 provided with the rolling elements 12 or the encoder 13*a* through the portion between the outer peripheral surface of the sensor insertion case 26*a* and the inner peripheral surface of the through hole 25*a*. Consequently, the structure of the present embodiment can fully ensure the sealing properties by the cap 19*a*.

Also, in the case of the present embodiment, the cylindrical part 39 constructing the sensor insertion case 26*a* is pressed in the small-diameter hole part 51 constructing the through hole 25*a* and also, the O ring 56 is pinched between the outer peripheral surface of the cylindrical part 39*a* and the inner peripheral surface of the middle-diameter hole part 53 in the state having the radial interference. As a result, the sensor insertion case 26*a* can effectively be prevented from coming out of the cap 19*a* even when the sensor unit 28*a* is detached from the cap 19*a*. Consequently, the sealing properties by the cap 19a before attaching the sensor unit 28a and with the sensor unit 28a detached can also be fully ensured.

The other configuration, action and effect are similar to hose of the case of the conventional structure described above.

Second Embodiment

Figure 2:
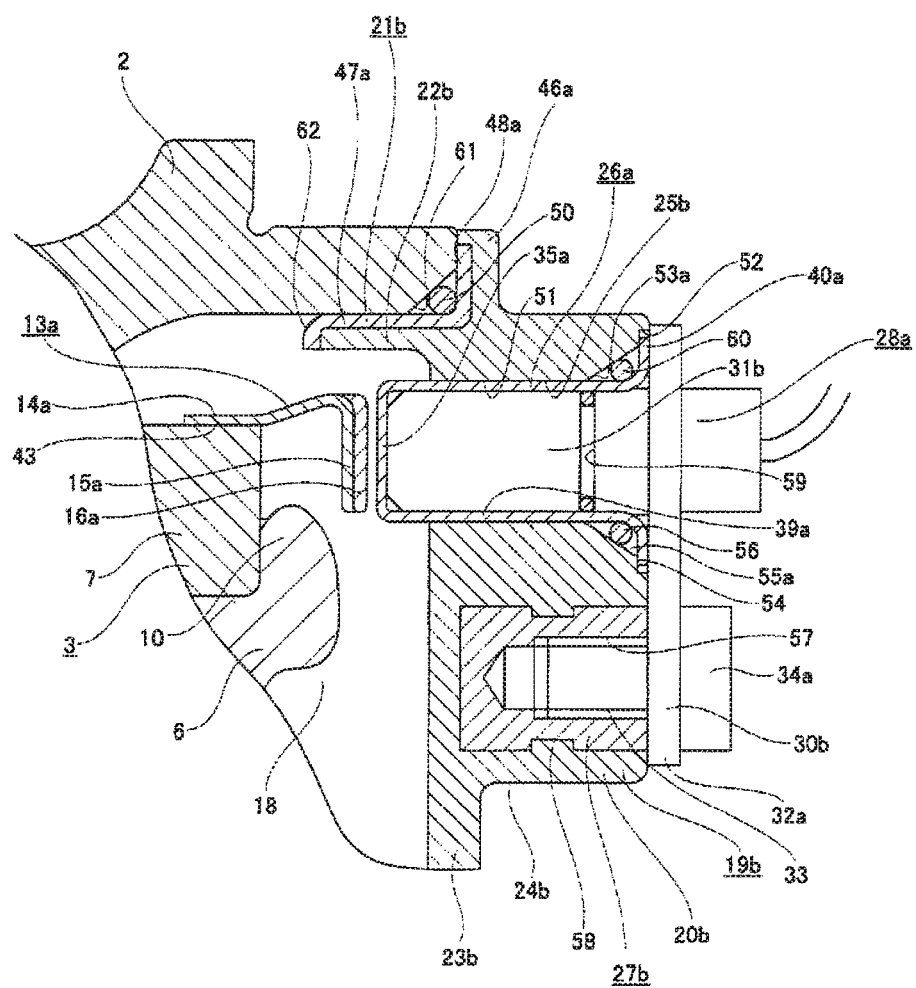
FIG. 2 is a partially sectional view of a rolling bearing unit with a rotating speed detector of a second embodiment of the invention.

FIG. 2 shows a second embodiment of the invention. In the case of the present embodiment, an axial thickness dimension of a mounting part 24b in a bottom part 23b constructing a cap body 20b is made smaller than that of the case of the first embodiment described above. Accordingly, a cylindrical part 39a constructing a sensor insertion case 26a and the distal end (axially outboard end) of an insertion part 31b constructing a sensor holder 30b are greatly projected to the axially outboard side beyond an axially outboard surface of the bottom part 23b.

Also, a shape of a through hole 25b formed in the bottom part 23b differs from that of the case of the first embodiment. That is, in the case of the present embodiment, an inner peripheral surface of a middle-diameter hole part 53a constructing the through hole 25b is formed in an inclined surface inclined in a direction in which the bore diameter dimension becomes larger toward the axially inboard side. And an O ring 56 is installed in annular space 55a with a triangular cross section formed between such an inclined surface and an outer peripheral surface of the cylindrical part 39a. In the case of the present embodiment, this O ring 56 is cot pressed in radial and axial directions between the inclined surface peripheral surface of the middle-diameter hole part 53a) and the outer peripheral surface of the cylindrical part 39a and an axially outboard surface of a rib part 40a.

Also, in the case of the present embodiment, an outer peripheral surface of the portion near to the proximal end (portion near to the axially inboard end) of the insertion part 31b is formed with a holder recessed groove 59, and a second O ring 60 with a circular cross section and a diameter smaller than that of the O ring 56 is pinched between this holder recessed groove 59 and an inner peripheral surface of the cylindrical part 39a in a state having an interference in the radial direction. In the illustrated structure, an axial position of this second O ring 60 is set in a position radially superposed on the part of continuity between the middle-diameter hole part 53a and a small-diameter hole part 51 constructing ti e through hole 25b.

Further, by decreasing an axial wall thickness of an abutting rib part 46a formed on a cylindrical part 22b constructing the cap body 20b, the whole axially outboard surface of an outboard flange part 48a constructing a fitting ring 21b molded in this cylindrical part 22b is exposed to the axially outboard side. And, an outside diameter side half part of the axially outboard surface of this outboard flange part 48a is abutted on an outside diameter side half part in an axially inboard end face of an outer ring 2. Also, an O ring 50 is pinched between a chamfered part 61 formed on an inner peripheral edge part of the axially inboard end face of the outer ring 2 and an outer peripheral surface of a press-in tubular part 47a and an inner side half part in the axially outboard surface of the outboard flange part 48a in a state compressed in the axial and radial directions. Further, the distal end of the press-in tubular part 47a is provided with a bent part 62 folded toward the radial inside, and an outside diameter side portion of a distal end face of the bent part 62 is formed in a convex curved surface. Also, in the case of the present embodiment, a cap nut with the axially outboard end closed is used as a nut 27b for screwing a bolt 34a used for mounting a sensor unit 28a.

In the case of the present embodiment having the configuration as described above, a material cost of the cap body 20b can be reduced by decreasing the axial thickness dimensions of the mounting part 24b and the abutting rib part 46a. Since a synthetic resin material constructing this cap body 20b is expensive, for example, glass fiber in 40 to 50% by weight is contained in a polyamide 66 resin, a cost reduction effect is great by decreasing the axial thickness dimensions. Also, the weight of the cap body 20a can be reduced together with such a cost reduction effect. Also, since the inner peripheral surface of the middle-diameter hole part 53a is formed in the inclined surface, this inclined surface can be used as a guide surface in the case of inserting the sensor insertion case 26a, with the result that workability of work of inserting this sensor insertion case 26a can be improved. Also, in the case of the present embodiment, the second O ring 60 is pinched between an inner peripheral surface of this sensor insertion case 26a and an outer peripheral surface of the insertion part 31b, with the result that foreign matter such as dust or calcium chloride can be prevented from entering a gap between the sensor insertion case 26a and the insertion part 31b. Consequently, for example, a resin constructing the sensor holder 30b or a metal constructing the sensor insertion case 26b can effectively be prevented from being deteriorated due to long-term use. Further, since the distal end of the press-in tubular part 47a constructing the fitting ring 21b is provided with the bent part 62 and also the axially inboard end face of the outer ring 2 is provided with the chamfered part 61, work of internally fitting and fixing a cap 19b of the present embodiment to the axially inboard end face of this outer ring 2 can be done easily. Also, since the cap nut is used as the nut 27b, in the case of embedding such a nut 27b in the inside of the cap body 20b by insert molding, the nut 27b can be embedded without being screwed into a male screw part like the case shown in FIG. 7. As a result, workability of the insert molding can be improved.

The other configuration, action and effect are similar to those of the case of the first embodiment described above.

Third Embodiment

Figure 3:
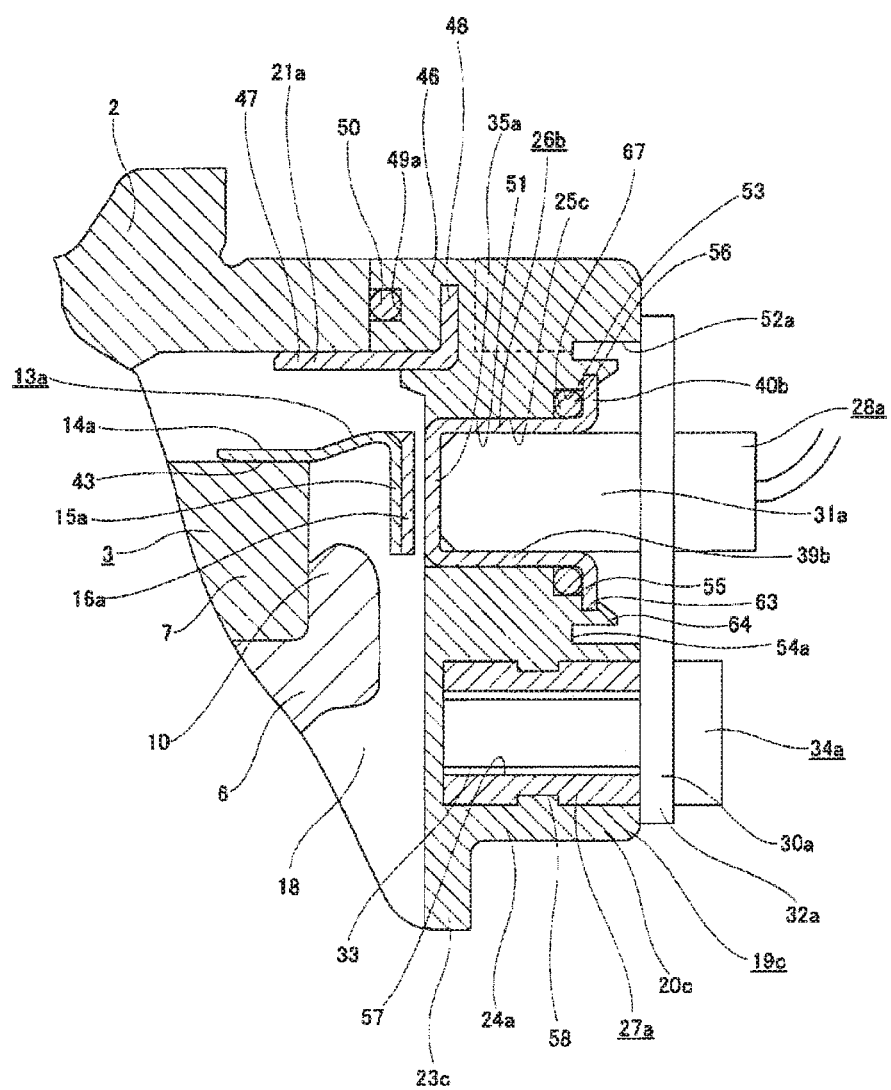
FIG. 3 is a partially sectional view of a rolling bearing unit with a rotating speed detector of a third embodiment of the invention.

FIG. 3 shows a third embodiment of the invention. In the case of the present embodiment, a shape of a through hole 25c formed in a bottom part 23c constructing a cap body 20c differs from that of the cases of the first and second embodiments described above. That is, in the case of the present embodiment, an axial dimension and a bore diameter dimension of a large-diameter hole part 52a formed in an opening of the axially inboard end of the through hole 25c are made larger than those of the cases of the first and second embodiments. And, an annular locking hook part (snap fit) 64 having a locking recessed groove 63 in an inner peripheral surface is formed in a state projected to the axially inboard side from a radial intermediate portion of a step surface 54a present between the large-diameter hole part 52a and a middle-diameter hole part 53. In addition, this locking hook part 64 corresponds to locking means described in the claim.

Also, in the case of the present embodiment, an axial dimension of a cylindrical part 39b constructing a sensor insertion case 26b is made shorter than that of the cases of the first and second embodiments, and an outer peripheral edge part of a rib part 40b formed on the axially inboard end of the sensor insertion case 26b is elastically locked on the locking recessed groove 63. That is, in the case of axially inserting the sensor insertion case 26b, the rib part 40b presses an inclined surface formed on an inner peripheral surface of the distal end of the locking hook part 64 to the radially outside and thereby, the outer peripheral edge part of the rib part 40b is engaged with the locking recessed groove 63 with this locking hook part 64 elastically deformed to the radially outside (the locking hook part 64 is elastically restored in the engaged state). Also, in the case of the present embodiment, a radially intermediate portion of an axially outboard surface of an abutting rib part 46 constructing the cap body 20c is formed with a recessed groove 49a recessed to the axially inboard side over the whole periphery. And, an O ring 50 is installed inside this recessed groove 49a. Also, in the case of the present embodiment, the support tubular part 45 (see FIG. 1) arranged in the inner side of the press-in tubular part 47 constructing the fitting ring 21a formed in the structure of the first embodiment is omitted from the cap body 20c.

In the case of the present embodiment having the configuration as described above, the sensor insertion case 26b is prevented from being axially displaced with respect to this cap body 20c with a sensor holder 30a detached from the cap body 20c (cap 19c) (a holding force by the cap body 20c is improved). Also, since the sensor insertion case 26b is supported by the locking hook part 64, the sensor insertion case 26b is not abutted on a mounting flange part 32a constructing the sensor holder 30a. As a result, an influence of a fastening force of a bolt 34a for coupling and fixing this sensor holder 30a to the cap body 20c can effectively be prevented from being exerted on the sensor insertion case 26b. As a result, a posture of the sensor insertion case 26b can be stabilized. Also, the through hole 25c having the configuration as described above can be formed by axial draw molding like the case of the first embodiment. In addition, the locking hook part 64 with a configuration continuous over the whole periphery can be adopted and moreover, the locking hook part can be constructed by arranging plural (for example, three to eight) locking hook pieces at equal distances in a circumferential direction.

The other configuration, action and effect are similar to those of the case of the first embodiment described above.

Fourth Embodiment

FIG. 4 shows a fourth embodiment of the invention. In the case of the present embodiment, like the case of the second embodiment described above, an inner peripheral surface of a middle-diameter hole part 53a constructing a through hole 25d is formed in an inclined surface inclined in a direction in which the bore diameter dimension becomes larger toward the axially inboard side. And, an O ring 56 is installed in annular space 55a with a triangular cross section formed between such an inclined surface and an outer peripheral surface of a cylindrical part 39c constructing a sensor insertion case 26c.

Also, the portion projected to the axially outboard side from an axially outboard surface of a bottom part 23d constructing a cap body 20d in the outer peripheral surface of the distal end of the cylindrical part 39c with the sensor insertion case 26c inserted into the through hole 25d is formed with plural (about two to ten) locking protrusions 65, 65 projected to the radially outside at equal distances in a circumferential direction. In addition, each of these locking protrusions 65, 65 corresponds to locking means described in the claim. On the other hand, plural circumferential places of an inner peripheral surface of a small-diameter hole part 51a constructing the through hole 25d are formed with locking recessed grooves 66, 66 having shapes and sizes (bore diameter dimension and circumferential width dimension) capable of axially passing through the locking protrusions 65, 65, and the number of locking recessed grooves 66, 66 is the same as the number of locking protrusions 65, 65. Also, a diameter of a virtual circumscribed circle passing through a bottom pail of each of these locking recessed grooves 66, 66 is made smaller than a bore diameter dimension of the abutting portion of the O ring 56 in the inner peripheral surface of the middle-diameter hole part 53a. Also, in the case of the present embodiment, a nut 27c whose outer peripheral surface is provided with a locking protrusion bar 70 is pressed in a bottomed nut insertion hole 69 whose inner peripheral surface is formed with a locking recessed groove 68 formed in the cap body 20d in a state adjusting a phase between the locking protrusion bar 70 and the locking recessed groove 68.

In the case of the present embodiment having the configuration as described above, the sensor insertion case 26c is inserted into the through hole 25d from the axially inboard side in a state matching a circumferential phase between each of the locking protrusions 65, 65 and each of the locking recessed grooves 66, 66. Then, in astute in which each of these locking protrusions 65, 65 is projected (exposed) from an axially outboard surface of the bottom part 23d to the axially outboard side, the sensor insertion case 26c is rotated, and the circumferential phase between each of the locking protrusions 65, 65 and each of the locking recessed grooves 66, 66 is shifted. Accordingly, an axially inboard surface of each of these locking protrusions 65, 65 is engaged with the portion circumferentially deviating from an opening of each of the locking recessed grooves 66, 66 in the axially outboard surface of the bottom part 23d to perform axial positioning of the sensor insertion case 26c with respect to a cap 19d. Also, the through hole 25d having the configuration as described above can be formed by axial draw molding like the case of each of the embodiments. Also, it is unnecessary that the number of locking protrusions 65, 65 should be necessarily the same as the number of locking recessed grooves 66, 66, and the number of locking protrusions 65, 65 may be smaller than the number of locking recessed grooves 66, 66. Also, as a support structure of the sensor insertion ring on the cap body, instead of the structure as described above, an inner peripheral surface of a through hole is formed in a simple cylindrical surface and also, the sensor insertion ring whose outer peripheral surface is formed with an axially long protrusion bar such as a serration is pressed in, and this protrusion bar can form an inner peripheral surface of the through hole with a recessed groove to lock the sensor insertion ring on the cap body.

The other configuration, action and effect are similar to those of the cases of the first to third embodiments described above.

The present application has been described in detail with reference to the specific embodiments, but it is apparent to those skilled in the art that various changes or modifications can be made without departing from the spirit and scope of the invention.

The present application is based on Japanese patent application (patent application No. 2014-027588) filed on Feb. 17, 2014, and the contents of the patent applications are hereby incorporated by reference.

INDUSTRIAL APPLICABILITY

The invention can also be implemented by properly combining the structure of each of the embodiments described above.

Also, a shape of the sensor insertion case is not limited to the structure of each of the embodiments, and it is unnecessary for the sensor insertion case to have the rib part on the axially inboard end as long as the sensor insertion case includes at least the cylindrical part and the bottom plate part for closing the axially outboard end of this cylindrical part. On the other hand, a rib part with an outside flange shape may be formed on the axially intermediate portion. Also, the cap is not limited to the structure in which the opening (cylindrical part) is provided with the metallic fitting ring, and the fitting ring can also be omitted.

DESCRIPTION OF REFERENCE NUMERALS AND SIGNS 1,1a ROLLING BEARING UNIT WITH ROTATING SPEED DETECTOR
2 OUTER RING
3 HUB
4a,4b OUTER RING RACEWAY
5 STATIONARY SIDE FLANGE
6 HUB BODY
7 INNER RING
8,8a INNER RING RACEWAY
9 SMALL-DIAMETER STEP PART
10 SWAGED PART
11 ROTATION SIDE FLANGE
12 ROLLING ELEMENT
13,13a ENCODER
14,14a METAL INSERT
15,15a CIRCULAR RING PART
16,16a ENCODER BODY
17 SEAL RING
18 SPACE
19,19a,19b,19c,19d CAP
20,20a,20b,20c,20d CAP BODY
21,21a,21b FITTING RING
22,22a,22b CYLINDRICAL PART
23,23a,23b,23c,23d BOTTOM PART
24,24a,24b MOUNTING PART
25,25a,25b,25c,25d THROUGH HOLE
26,26a,26b,26c SENSOR INSERTION CASE
27,27a,27b,27c NUT
28,28a SENSOR UNIT
29,29a SENSOR
30,30a,30b SENSOR HOLDER
31,31a,31b INSERTION PART
32,32a MOUNTING FLANGE PART
33 MALE SCREW PART
34,34a BOLT
35,35a BOTTOM PLATE PART
36 UPPER MOLDING DIE
37 LOWER MOLDING DIE
38 CAVITY
39,39a,39b,39c CYLINDRICAL PART
40,40a,40b RIB PART
41 BENT PART
42 ABUTTING SURFACE
43 FITTING TUBULAR PART
44 OUTSIDE RIB PART
45 SUPPORT TUBULAR PART
46,46a ABUTTING RIB PART
47 PRESS-IN TUBULAR PART
48,48a OUTBOARD FLANGE PART
49 RECESSED GROOVE
50 O RING
51,51a SMALL-DIAMETER HOLE PART
52,52a LARGE-DIAMETER HOLE PART
53,53a MIDDLE-DIAMETER HOLE PART
54,54a STEP SURFACE
55,55a ANNULAR SPACE
56 O RING
57 FEMALE SCREW PART
58 RECESSED GROOVE
59 HOLDER RECESSED GROOVE.
60 O RING
61 CHAMFERED PART
62 BENT PART
63 LOCKING RECESSED GROOVE
64 LOCKING HOOK PART
65 LOCKING PROTRUSION
66 LOCKING RECESSED GROOVE
67 STEP SURFACE
68 LOCKING RECESSED GROOVE
69 NUT INSERTION HOLE
70 LOCKING PROTRUSION BAR

The invention claimed is:

1. A rolling bearing unit with a rotating speed detector, comprising: an outer ring which has double row outer ring raceways on an inner peripheral surface and is not rotated in use,
a hub which has double row inner ring raceways on an outer peripheral surface and is supported in a inner side of the outer ring concentrically with the outer ring and provides a portion projected to an axially outboard side beyond an axially outboard end of the outer ring in the outer peripheral surface with a rotation side flange for supporting a wheel,
plural rolling elements rollably formed between the outer ring raceways and the inner ring raceways, respectively,
an annular encoder formed by changing magnetic characteristics of an axially inboard surface alternately with respect to a circumferential direction, the encoder supported in an axially inboard end of the hub concentrically with the hub,
a synthetic resin-made cap which is attached to an axially inboard end of the outer ring and closes an opening of the axially inboard end of the outer ring,
a bottomed cylindrical sensor insertion case made of a non-magnetic material, the sensor insertion case internally fitted to an inside of a through hole formed in a portion axially opposed to the encoder in the cap, and
a sensor unit comprising a sensor which is opposed to a detected surface of the encoder through a bottom plate part of the sensor insertion case and changes an output signal according to a change in characteristics of the detected surface of the encoder, and a sensor holder having an insertion part which holds the sensor and is inserted into an inside of the sensor insertion case, and a mounting flange part which is formed on a proximal end of the insertion part and is coupled and fixed to an axially inboard surface of the cap,
characterized in that the sensor insertion case is internally fitted to the inside of the through hole by being axially inserted into the inside of the through hole previously formed in the cap, and
an annular elastic member is pinched between an outer peripheral surface of the sensor insertion case and an axially inboard end side portion in an inner peripheral surface of the through hole in a state having a radial interference.

2. The rolling bearing unit with the rotating speed detector according to claim 1, wherein:

the sensor insertion case has a cylindrical part, the bottom plate part for closing an opening of an axially outboard end of the cylindrical part, and a rib part bent from an axially inboard end of the cylindrical part to a radially outside;

an opening edge part of the through hole in an axially inboard surface of the cap is provided with a step surface recessed to an axially outboard side; and the rib part is axially pinched between the step surface and the mounting flange part constructing the sensor holder.

3. The rolling bearing unit with the rotating speed detector according to claim 1, wherein an engaging unit configured to prevent the sensor insertion case from being axially displaced with respect to the cap is formed between the cap and the sensor insertion case.

* * * * *